United States Patent
Bouldin et al.

(10) Patent No.: US 10,648,666 B2
(45) Date of Patent: May 12, 2020

(54) ANGLED COMBUSTOR LINER COOLING HOLES THROUGH TRANSVERSE STRUCTURE WITHIN A GAS TURBINE ENGINE COMBUSTOR

(71) Applicant: United Technologies Corporation, Hartford, CT (US)

(72) Inventors: Lee E. Bouldin, Woodbridge, CT (US); Dennis M. Moura, South Windsor, CT (US); Jonathan J. Eastwood, Newington, CT (US); Monica Pacheco-Tougas, Waltham, MA (US)

(73) Assignee: United Technologies Corporation, Farmington, CT (US)

( * ) Notice: Subject to any disclaimer, the term of this patent is extended or adjusted under 35 U.S.C. 154(b) by 232 days.

(21) Appl. No.: 14/913,770

(22) PCT Filed: Sep. 16, 2014

(86) PCT No.: PCT/US2014/055791
§ 371 (c)(1),
(2) Date: Feb. 23, 2016

(87) PCT Pub. No.: WO2015/039075
PCT Pub. Date: Mar. 19, 2015

(65) Prior Publication Data
US 2016/0208704 A1    Jul. 21, 2016

Related U.S. Application Data

(60) Provisional application No. 61/878,337, filed on Sep. 16, 2013.

(51) Int. Cl.
*F23R 3/00* (2006.01)
*F23R 3/60* (2006.01)
(Continued)

(52) U.S. Cl.
CPC ............... *F23R 3/002* (2013.01); *F02C 7/18* (2013.01); *F23R 3/06* (2013.01); *F23R 3/60* (2013.01);
(Continued)

(58) Field of Classification Search
CPC .. F23R 3/002; F23R 3/04; F23R 3/045; F23R 3/06; F23R 2900/03041; F23R 2900/03042; F23R 2900/03044
See application file for complete search history.

(56) References Cited

U.S. PATENT DOCUMENTS 4,887,432 A    12/1989    Mumford et al.
5,331,816 A    7/1994    Able et al.
(Continued)

FOREIGN PATENT DOCUMENTS

WO    WO-2014112992 A1 *    7/2014    ............... F23R 3/06

OTHER PUBLICATIONS

Extended EP Search Report dated Dec. 20, 2016.

*Primary Examiner* — Scott J Walthour
(74) *Attorney, Agent, or Firm* — Getz Balich LLC

(57) ABSTRACT

A wall assembly for use in a combustor of a gas turbine engine includes a transverse structure with at least one effusion passage that extends at an angle α therethrough. The effusion passage includes an inlet in an outer periphery of a wall. A wall assembly within a gas turbine engine include a liner panel generally parallel to a support shell and a transverse structure with at least one effusion passage that extends at an angle α therethrough. The effusion passage includes an inlet in an outer periphery of a wall that is transverse to the liner panel and the support shell.

13 Claims, 9 Drawing Sheets

(51) Int. Cl.
  *F23R 3/06* (2006.01)
  *F02C 7/18* (2006.01)

(52) U.S. Cl.
  CPC ...... *F05D 2220/32* (2013.01); *F05D 2240/35* (2013.01); *F05D 2260/201* (2013.01); *F23R 2900/03041* (2013.01); *Y02T 50/675* (2013.01)

(56) References Cited

U.S. PATENT DOCUMENTS

| | | | |
|---|---|---|---|
| 6,205,789 B1 | 3/2001 | Patterson et al. | |
| 6,408,628 B1 | 6/2002 | Pidcock et al. | |
| 6,470,685 B2 | 10/2002 | Pidcock et al. | |
| 6,901,757 B2 | 6/2005 | Gerendas | |
| 7,065,971 B2 | 6/2006 | Bellucci et al. | |
| 7,093,441 B2 | 8/2006 | Burd et al. | |
| 7,146,815 B2 | 12/2006 | Burd | |
| 7,363,763 B2 | 4/2008 | Coughlan, III et al. | |
| 7,849,694 B2 | 12/2010 | Dahlke et al. | |
| 7,954,325 B2 | 6/2011 | Burd et al. | |
| 8,015,829 B2 | 9/2011 | Coughlan, III et al. | |
| 8,113,004 B2 | 2/2012 | Carlisle et al. | |
| 8,256,224 B2 | 9/2012 | Garry et al. | |
| 2002/0124572 A1 | 9/2002 | Pidcock et al. | |
| 2003/0182942 A1 | 10/2003 | Gerendas | |
| 2003/0200752 A1 | 10/2003 | Moertle et al. | |
| 2004/0006995 A1 | 1/2004 | Snyder | |
| 2004/0104538 A1 | 6/2004 | Pidcock et al. | |
| 2005/0249583 A1 | 11/2005 | Mongillo et al. | |
| 2006/0059916 A1 | 3/2006 | Cheung et al. | |
| 2010/0236248 A1* | 9/2010 | Kaleeswaran | F23R 3/06 60/752 |
| 2010/0247284 A1 | 9/2010 | Gregg et al. | |
| 2013/0019604 A1 | 1/2013 | Cunha et al. | |
| 2013/0025287 A1 | 1/2013 | Cunha | |
| 2013/0078582 A1 | 3/2013 | Pidcock | |

\* cited by examiner

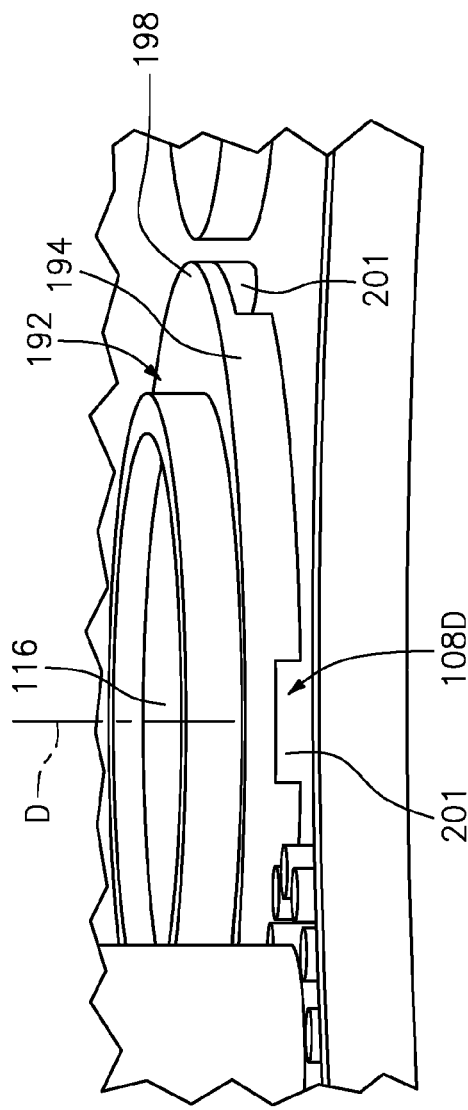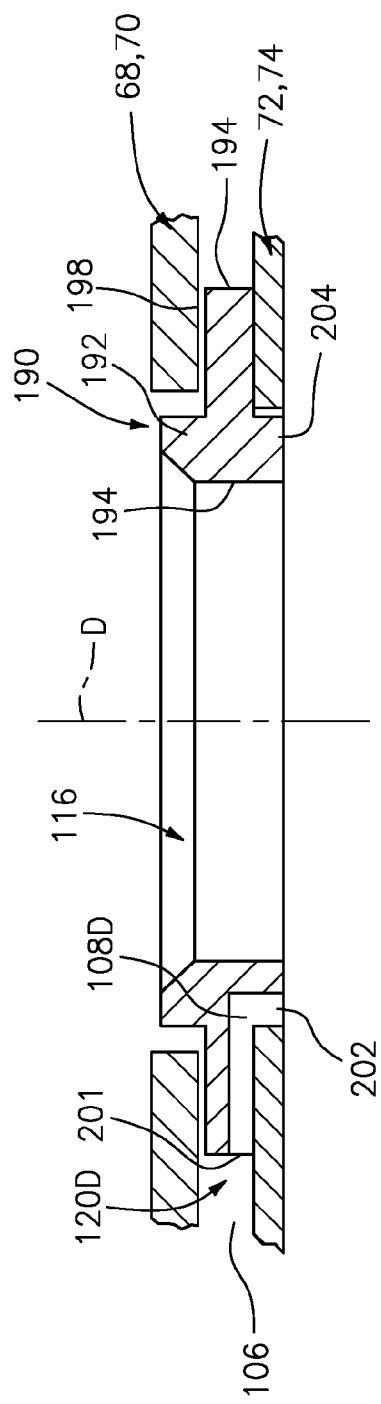

ANGLED COMBUSTOR LINER COOLING HOLES THROUGH TRANSVERSE STRUCTURE WITHIN A GAS TURBINE ENGINE COMBUSTOR

CROSS-REFERENCE TO RELATED APPLICATION

This application claims priority to PCT Patent Application No. PCT/US2014/055791 filed Sep. 16, 2014, which claims priority to U.S. Patent Appln. Ser. No. 61/878,337 filed Sep. 16, 2013, each of which is hereby incorporated herein by reference in its entirety.

BACKGROUND

The present disclosure relates to a gas turbine engine and, more particularly, to cooling structure used with a combustor section.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section typically includes an outer support shell lined with heat shields, often referred to as floatwall liner panels, which are attached to the outer shell with studs and nuts. In certain arrangements, each dilution passage is located through the liner panels and support shell to direct dilution air into the combustion chamber. In addition to the dilution passages, the outer shell may also have relatively smaller air impingement passages to direct cooling air between the liner panels and the support shell to impinge upon the cold side of the liner panels. This cooling air then exits effusion passages through the liner panels to form a cooling air film on a hot side of the floatwall panels that serves as a barrier to minimize thermal damage.

One particular region where localized combustor hot spots may arise is around the dilution passages. The dilution passages inject relative lower temperature air into the swirling fuel-rich cross flow for combustion. As the air penetrates into the fuel-rich cross-stream, heat release takes place along the reaction front to form high temperature regions around the dilution passages. A stagnation region along the upstream side of the dilution passages may also form a higher pressure environment such that cross flow momentum deflects the incoming dilution air jet. The combination of high pressure and the deflection of the incoming dilution air jet may form a high temperature recirculation region along the inner surface of the dilution passage.

A lower velocity region of flow along the perimeter of the dilution passage may also be highly susceptible to inflow of hot combustion gas products. The inflow of these products can occur within a localized ingestion region and may result in a durability concern because a low temperature boundary condition is replaced by high temperature gases.

SUMMARY

A wall assembly within a gas turbine engine, according to one disclosed non-limiting embodiment of the present disclosure, includes a transverse structure with at least one effusion passage. The at least one effusion passage includes an inlet in an outer periphery of the transverse structure.

In a further embodiment of the present disclosure, the outer periphery is at least partially circular.

In a further embodiment of any of the foregoing embodiments of the present disclosure, the outer periphery is at least partially linear.

In a further embodiment of any of the foregoing embodiments of the present disclosure, the transverse structure includes a wall that at least partially defines a dilution passage through a liner panel.

In a further embodiment of any of the foregoing embodiments of the present disclosure, the wall includes a seal face in contact with a support shell.

In a further embodiment of any of the foregoing embodiments of the present disclosure, the effusion passage includes an outlet through a hot side of the liner panel.

In a further embodiment of any of the foregoing embodiments of the present disclosure, the at least one effusion passage extends at an angle $\alpha$. The angle $\alpha$ defines an outlet which does not penetrate an inner periphery of the transverse structure.

In a further embodiment of any of the foregoing embodiments of the present disclosure, the inlet is in communication with an impingement cavity.

In a further embodiment of any of the foregoing embodiments of the present disclosure, a liner panel and a support shell are included that defines the impingement cavity therebetween.

In a further embodiment of any of the foregoing embodiments of the present disclosure, the transverse structure at least partially defines an annular grommet.

In a further embodiment of any of the foregoing embodiments of the present disclosure, a liner panel and a support shell are included. The annular grommet is located between the liner panel and the support shell.

In a further embodiment of any of the foregoing embodiments of the present disclosure, the at least one effusion passage extends at an angle $\alpha$. The angle $\alpha$ defines an outlet in a hot side of the annular grommet. The hot side is generally parallel to a hot side of the liner panel.

In a further embodiment of any of the foregoing embodiments of the present disclosure, the transverse structure at least partially defines a rail that extends from a liner panel.

In a further embodiment of any of the foregoing embodiments of the present disclosure, the transverse structure is located within at least one of a combustor section, an augmentor section, an exhaust duct section or a nozzle section of a gas turbine engine.

A wall assembly adjacent a combustion chamber within a gas turbine engine, according to another disclosed non-limiting embodiment of the present disclosure, includes a support shell; a liner panel adjacent to the support shell; and a transverse structure between the support shell and the liner panel. The transverse structure includes at least one effusion passage that extends at an angle $\alpha$. The at least one effusion passage includes an inlet in an outer periphery of the transverse structure.

In a further embodiment of any of the foregoing embodiments of the present disclosure, the transverse structure at least partially defines a dilution passage that extends from the liner panel.

In a further embodiment of any of the foregoing embodiments of the present disclosure, the transverse structure at least partially defines an annular grommet.

In a further embodiment of any of the foregoing embodiments of the present disclosure, the transverse structure at least partially defines a rail that extends from a liner panel.

A method of cooling a wall assembly within a gas turbine engine, according to another disclosed non-limiting embodiment of the present disclosure, includes directing at least one effusion passage between an inlet in an outer periphery of a transverse structure at least partially between a liner panel and a support shell. The inlet is in communication with an impingement cavity between the liner panel and the support shell.

In a further embodiment of any of the foregoing embodiments of the present disclosure, the method includes defining the passage at an angle α to avoid penetration of an inner periphery of the transverse geometry.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 9 is a sectional view of another annular grommet which defines a dilution passage and an effusion passage a portion of which extends transverse to the dilution passage in accordance with one disclosed non-limiting embodiment; and FIG. 10 is a perspective view of the annular grommet dilution passage of FIG. 9 from a cold side of the liner panel.

DETAILED DESCRIPTION

Figure 1:
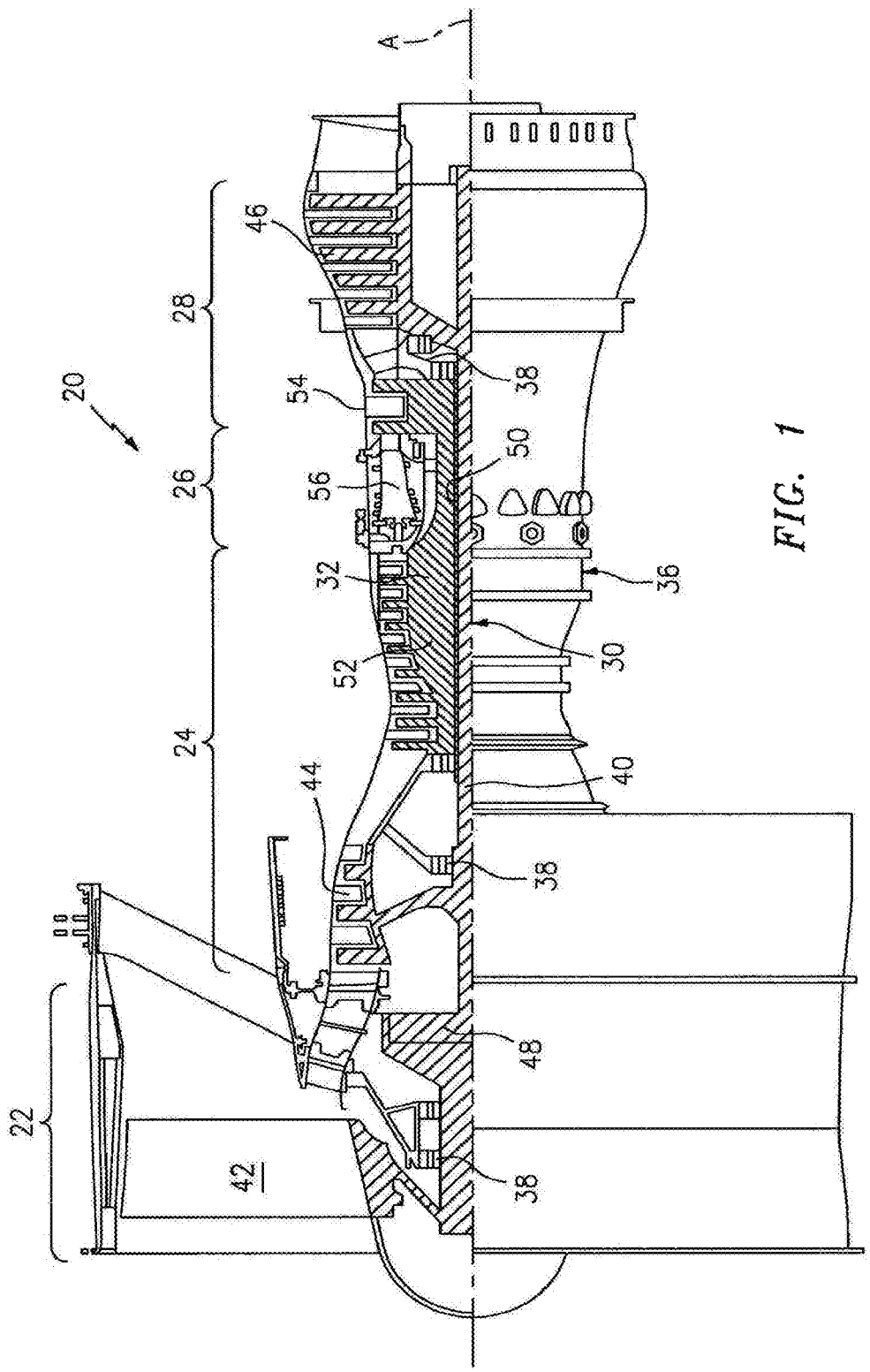
FIG. 1 is a schematic cross-section of an example gas turbine engine architecture.
Figure 2:
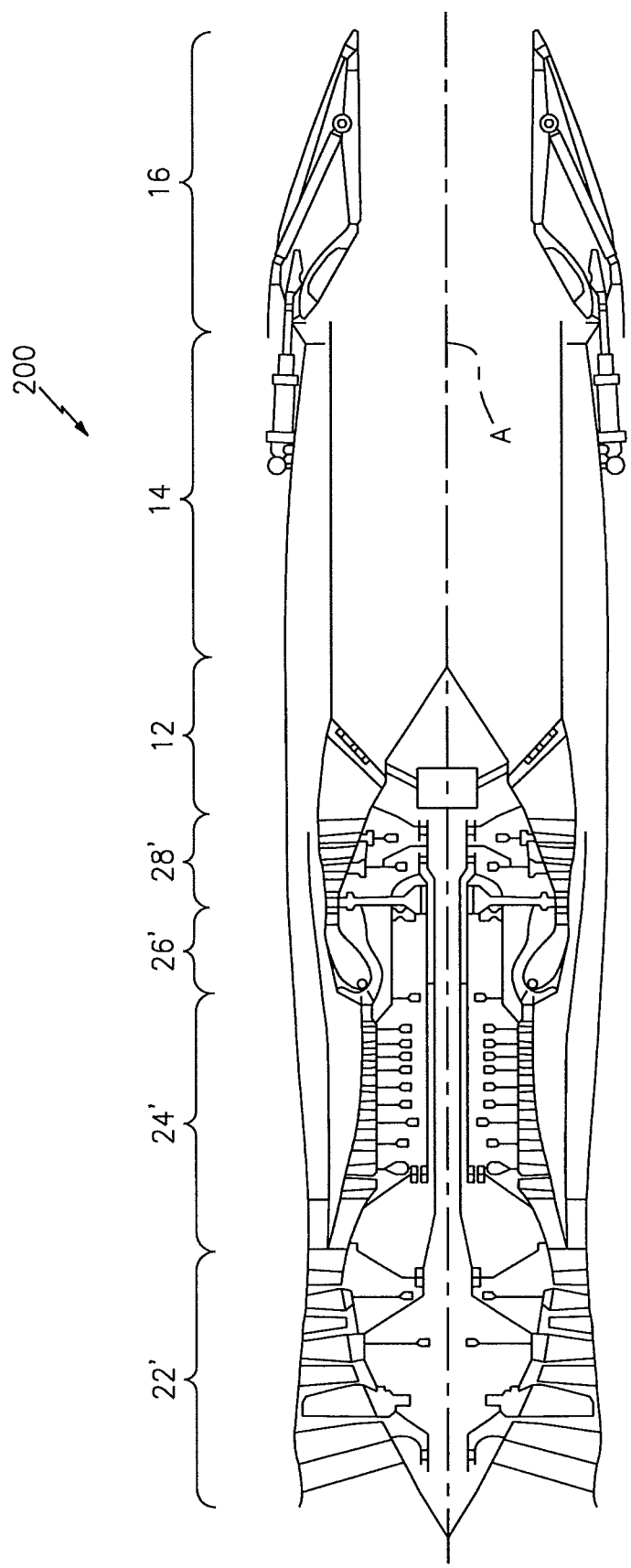
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath and into the compressor section 24 to drive core air along a core flowpath. The core air is compressed then communicated into the combustor section 26 for downstream expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans with an intermediate spool.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

Figure 3:
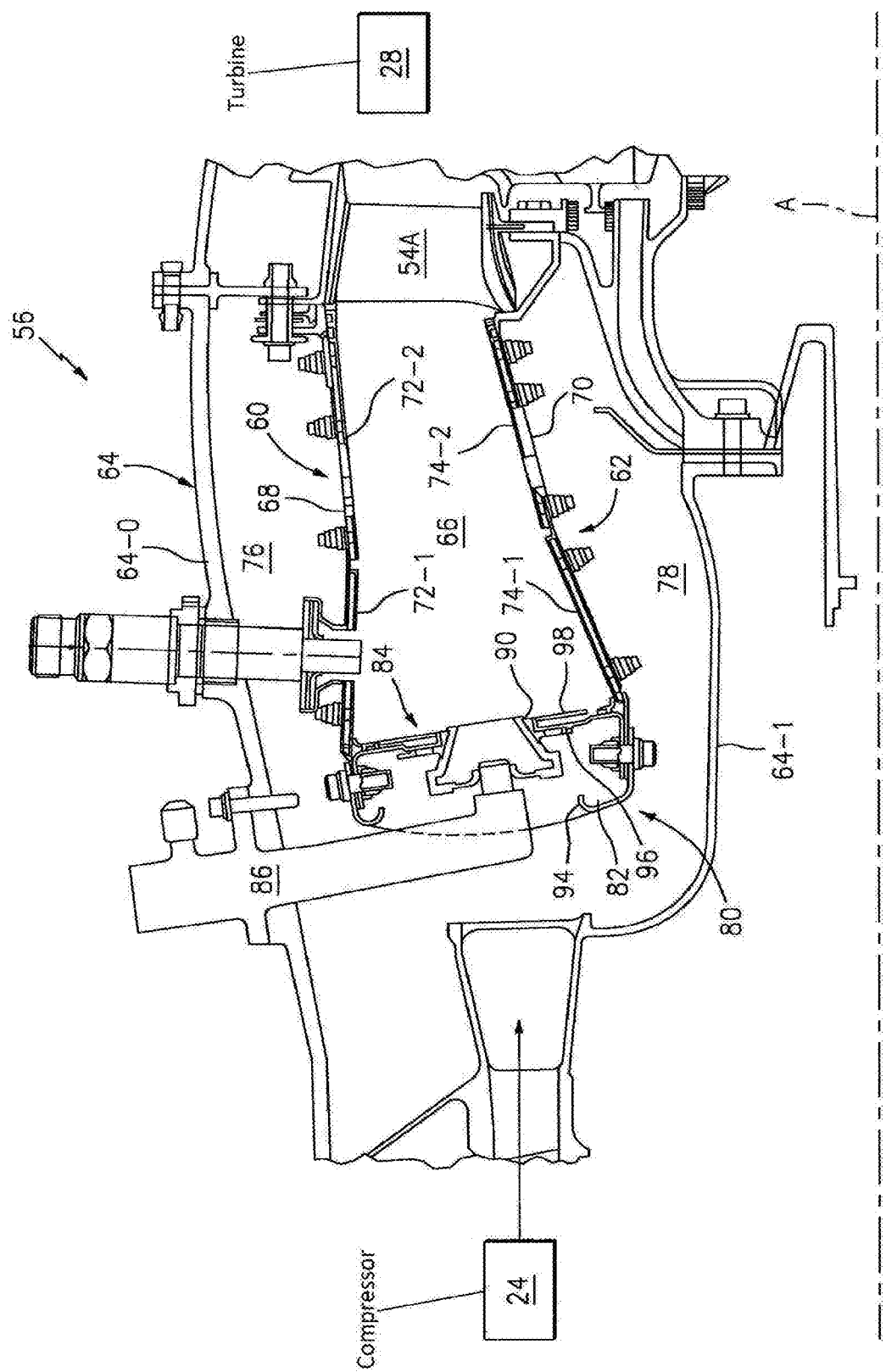
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64 therearound. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64-O of the diffuser case module 64 to define an outer annular plenum 76. The inner combustor wall assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto. Each of the liner panels 72, 74 may be generally rectilinear and manufactured of, for example, a nickel based super alloy, ceramic or other temperature resistant material and are arranged to form a liner array. In the liner array, a multiple of forward liner panels 72-1 and a multiple of aft liner panels 72-2 are circumferentially staggered to line the outer shell 68. A multiple of forward liner panels 74-1 and a multiple of aft liner panels 74-2 are circumferentially staggered to also line the inner shell 70.

The combustor 56 further includes a forward assembly 80 immediately downstream of the compressor section 24 to receive compressed airflow therefrom. The forward assembly 80 generally includes an annular hood 82 and a bulkhead assembly 84 that supports a multiple of swirlers 90 (one shown). Each of the swirlers 90 is circumferentially aligned with one of a multiple of fuel nozzles 86 (one shown) and a multiple of respective hood ports 94.

The bulkhead assembly 84 includes a bulkhead support shell 96 secured to the combustor walls 60, 62, and a multiple of circumferentially distributed bulkhead liner panels 98 secured to the bulkhead support shell 96 around each respective swirler opening 92. The bulkhead support shell 96 is generally annular and the multiple of circumferentially distributed bulkhead liner panels 98 are segmented, typically one to each fuel nozzle 86 and swirler 90.

The annular hood 82 extends radially between, and is secured to, the forwardmost ends of the combustor wall assemblies 60, 62. The multiple of circumferentially distributed hood ports 94 facilitate the direction of compressed air into the forward end of the combustion chamber 66 through each respective swirler 90. Each fuel nozzle 86 may be secured to the diffuser case module 64 to project into the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
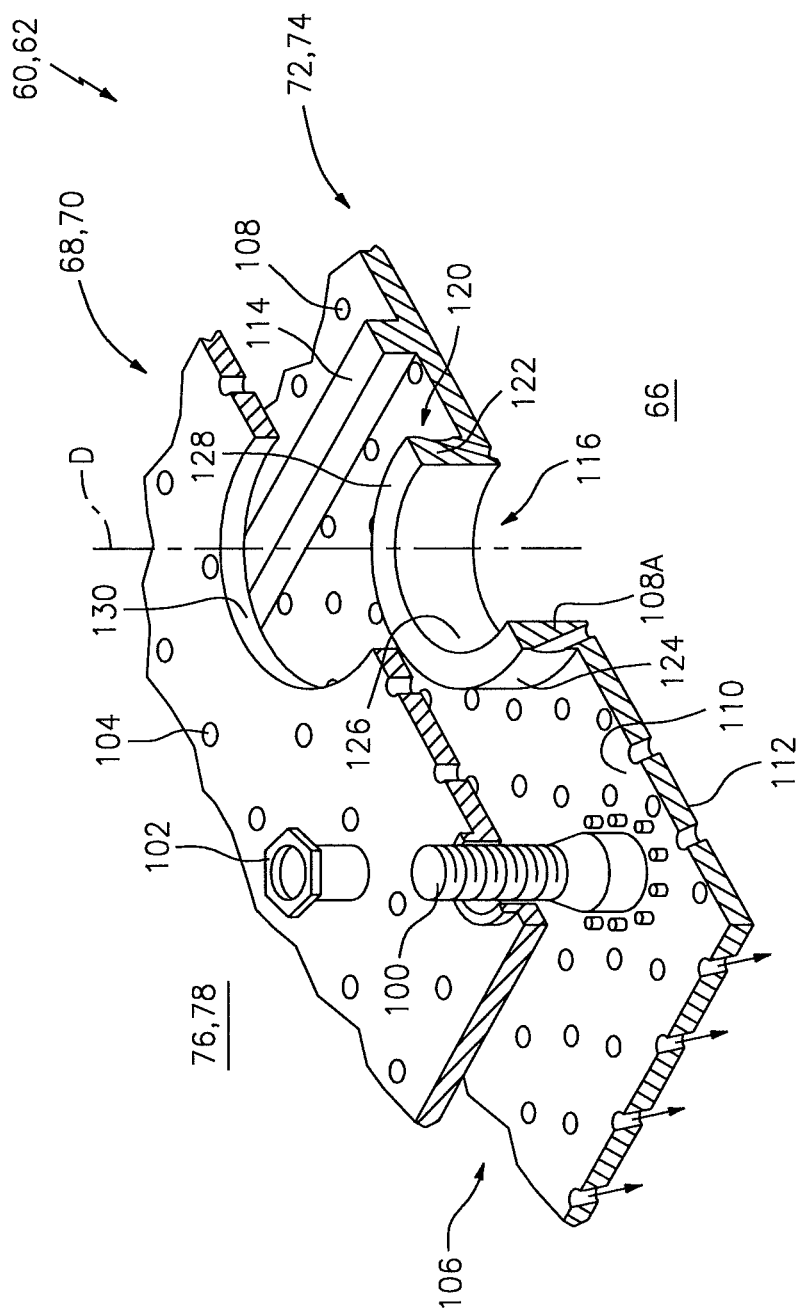
FIG. 4 is an exploded view of a wall assembly with a dilution passage.
Figure 5:
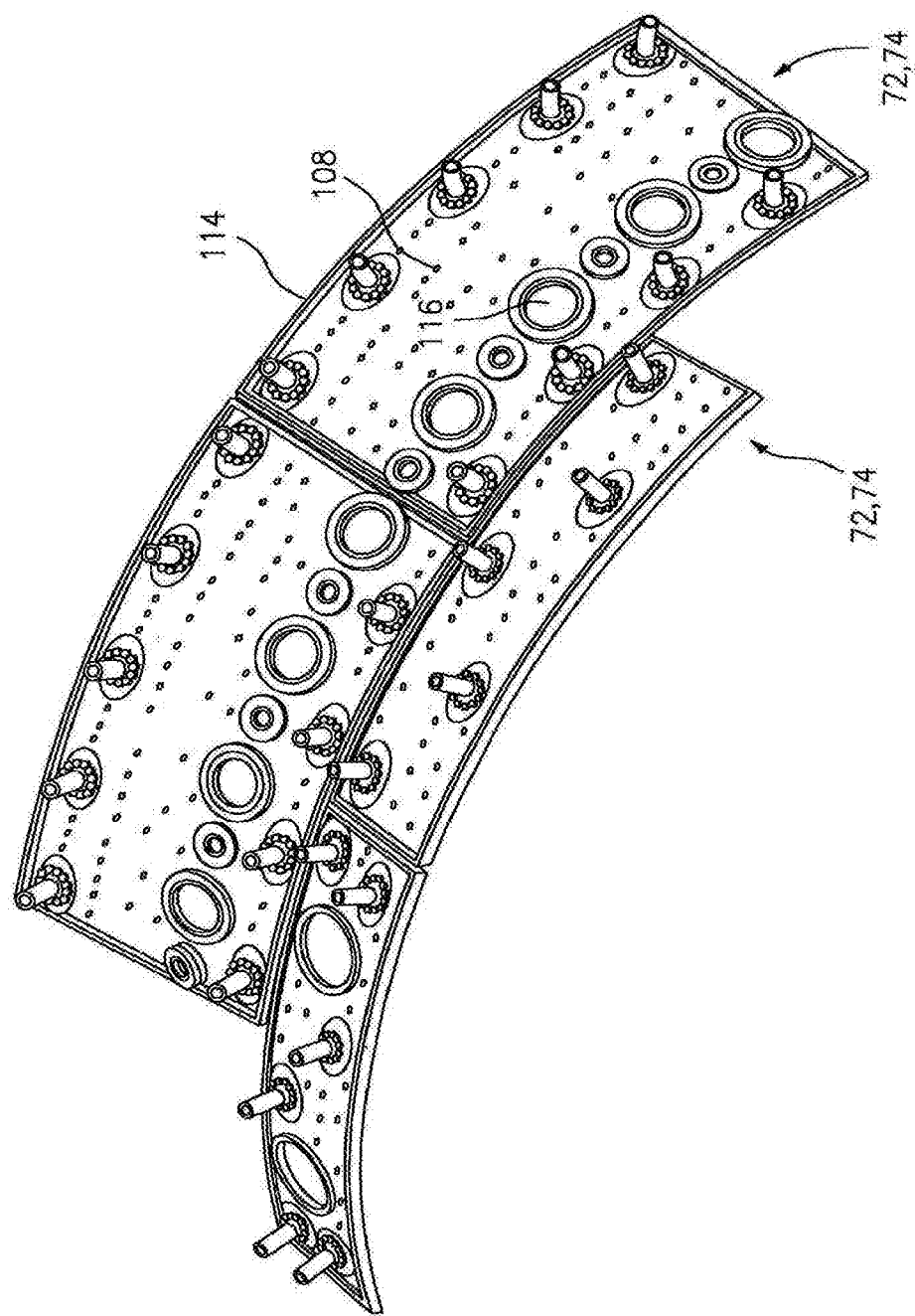
FIG. 5 is a perspective cold side view of a liner panel array.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 through the respective support shells 68, 70 to receive the fasteners 102 at a threaded distal end section thereof to define one or more impingement cavities 106. The liner panels 72, 74 typically include one or more rails 114 (shown partially) that extend from a cold side 110 thereof. The rail 114 extends around the periphery of the cold side 110 (FIG. 5) to interface with their respective support shells 68, 70 when mounted thereto to define the one or more impingement cavities 106. That is, the rails 114 may at least extend around the cold side 110 periphery and may include further internal rails to define additional compartments.

A multiple of cooling impingement passages 104 penetrate through the support shells 68, 70 to allow air from the respective annular plenums 76, 78 to enter impingement cavities 106 formed within the combustor wall assemblies 60, 62 between the respective support shells 68, 70 and liner panels 72, 74. The cooling impingement passages 104 are generally normal to the surface of the liner panels 72, 74. The air in the cavities 106 provides cold side impingement cooling of the respective liner panels 72, 74 that is generally defined herein as heat removal via internal convection.

A multiple of effusion passages 108 penetrate through each of the liner panels 72, 74. The structure of the passages (e.g., diameter, shape, density, surface angle, incidence angle, etc.) as well as the location of the passages with respect to the high temperature combustion gas flow also contributes to effusion film cooling. The combination of impingement passages 104 and effusion passages 108 may be referred to as an Impingement Film Floatwall (IFF) assembly.

The effusion passages 108 allow the air to pass from each cavity 106 defined in part by the cold side 110 of the liner panels 72, 74 to a hot side 112 thereof and facilitate the formation of a relatively thin, cool, insulating blanket of cooling air along the hot side 112. The effusion passages 108 are generally more numerous than the impingement passages 104 to promote the development of a sheath of film cooling along the hot side 112. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through the respective support shells 68, 70 and liner panels 72, 74 along a common axis D. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

At least one of the multiple of dilution passages 116 in one disclosed non-limiting embodiment, include a transverse structure 120 that extends from the associated liner panels 72, 74 along axis D toward the support shells 68, 70. The transverse structure 120 generally includes a wall 122 with an outer periphery 124, an inner periphery 126 and a seal face 128 therebetween. The inner periphery 126 generally corresponds with an aperture 130 in the respective support shell 68, 70. As the fasteners 102 are secured to the studs 100 and the liner panels 72, 74 are pulled toward their respective support shells 68, 70, the seal interface 128 contacts the respective support shells 68, 70 to form a dilution flow path along the axis D. The aperture 130 and the inner periphery 126 define each dilution passage 116 through the respective combustor wall assemblies 60, 62.

Figure 6:
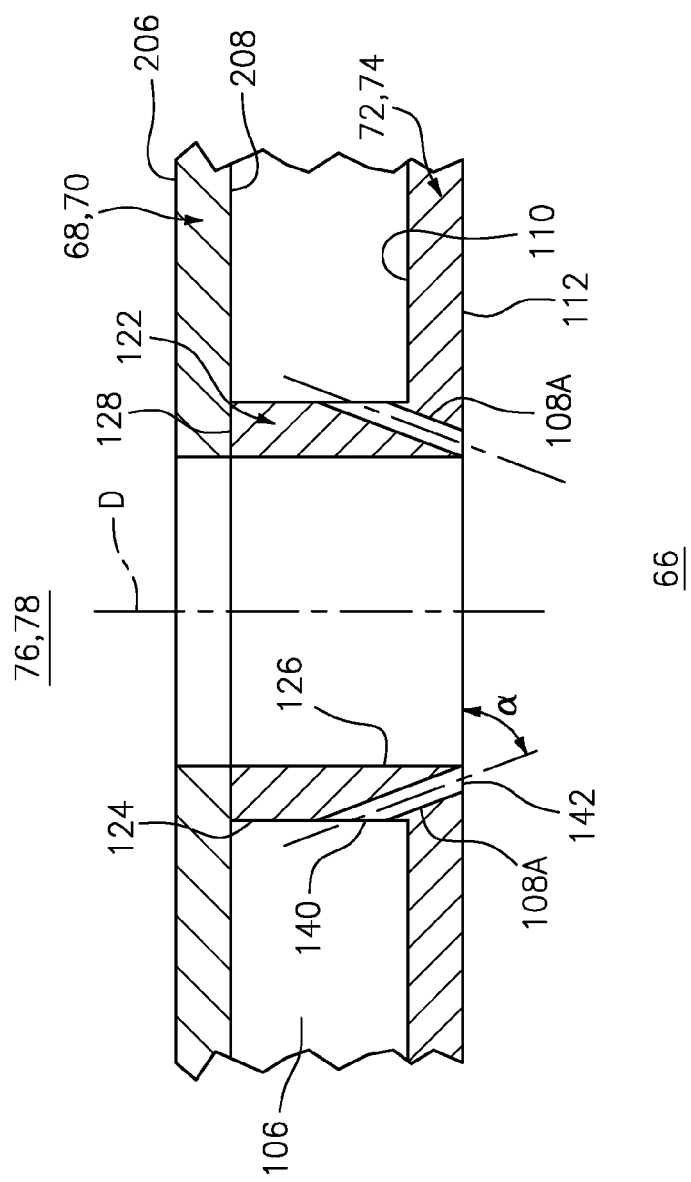
FIG. 6 is a sectional view of an integral liner panel which includes a vertical wall defining a dilution passage and effusion passages extending through the vertical wall transverse to the dilution passage according to one disclosed non-limiting embodiment.

With reference to FIG. 6, in one disclosed non-limiting embodiment, the transverse structure 120 includes at least one effusion passage 108A that extends at an angle α therethrough. Although a particular circular shape to the passage 108A is illustrated, it should be appreciated that various passage structure (e.g., diameter, shape, density, surface angle, incidence angle, etc.) will also benefit herefrom.

Each respective support shell 68, 70 includes a first side 206 and a second side 208 opposite the first side 206. Each of the effusion passages 108A includes an inlet 140 in the outer periphery 124 and an outlet 142 in the hot side 112. That is, each effusion passages 108A is angled at the angle a such that the outlet 142 does not penetrate through the inner periphery 126 and the inlet 140 does not penetrate through the seal face 128. Each effusion passage 108A is thereby relatively closer to a potentially distressed area defined around the inner periphery 126 without compromise of the seal face 128 that engages the second side 208 of the respective support shell 68, 70. This, in turn, reduces circulation of dilution air and combustion products near the dilution passages 116 and facilitates effusion cooling to lower metal temperatures.

Figure 7:
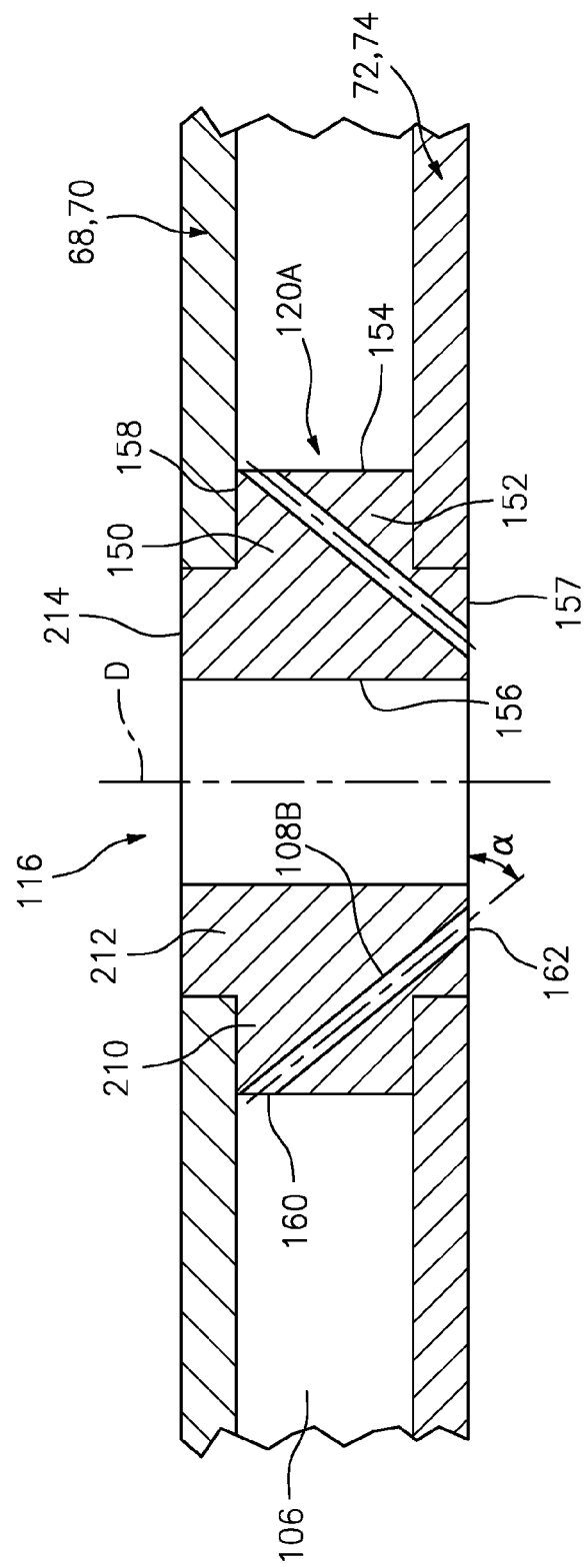
FIG. 7 is a sectional view of an annular grommet defining a dilution passage and effusion passages extending through the annular grommet transverse to the dilution passage according to another disclosed non-limiting embodiment.

With reference to FIG. 7, at least one of the multiple of dilution passage 116 in another disclosed non-limiting embodiment, is defined by an annular grommet 150. The annular grommet 150 generally includes an outer portion 210, mounted between the second side 208 of the respective support shell 68, 70 and the cold side 110 of the associated liner panels 72, 74 along axis D, and an inner portion 212. The annular grommet 150 generally includes a transverse structure 120A with a wall 152 that defines an outer periphery 154 along the outer portion 210, an inner periphery 156 along the inner portion 212, and a seal face 158 disposed between the outer portion 210 and the second side 208 of the respective support shell 68, 70. The inner portion 212 of the grommet 150 has a hot side 157 and a cold side 214 opposite the hot side 157. It should be appreciated that the transverse structure need not be linear. The annular grommet 150 permits the respective support shell 68, 70 and associated liner panels 72, 74 to be manufactured as generally consistent flat panels as the annular grommet 150 separately defines the dilution passage 116.

In this disclosed non-limiting embodiment, an effusion passages 108B are defined within the annular grommet 150. The effusion passages 108B includes an inlet 160 in the outer periphery 154 and an outlet 162 in the hot side 157 generally parallel to the hot side 112 of the respective liner panel 72, 74. That is, each effusion passages 108B is angled at the angle a such that the outlet 162 does not penetrate through the inner periphery 156 and the inlet 160 does not penetrated a seal face 158 of the annular grommet that interfaces with the respective support shell 68, 70.

Figure 8:
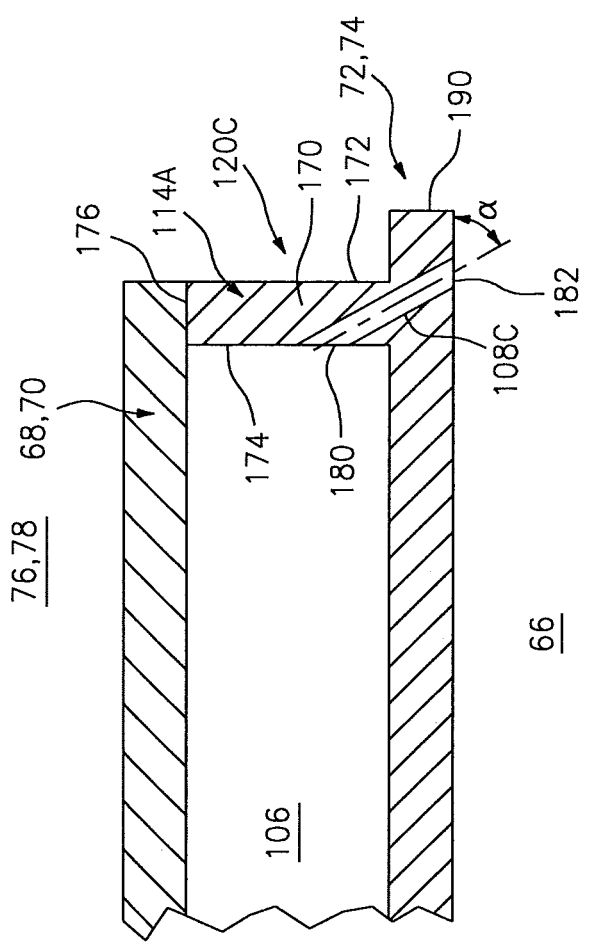
FIG. 8 is a sectional view of a rail with a wall extending transverse to a combustor liner panel and defining an effusion passage therethrough transverse to the liner panel according to another disclosed non-limiting embodiment.

With reference to FIG. 8, in another disclosed non-limiting embodiment, at least one rail 114A generally includes a transverse structure 120C with a wall 170 that defines an outer periphery 172, an inner periphery 174 and a seal face 176 therebetween. The outer periphery 172 as defined with respect to the rail 114A at least partially surrounds the impingement cavity 106 while the seal face 176 contacts the respective support shells 68, 70 to seal the impingement cavity 106.

In this disclosed non-limiting embodiment, effusion passages 108C are located within the rail 114A. The effusion passages 108C includes an inlet 180 in the outer periphery 172 and an outlet 182 in the hot side 112. That is, each effusion passages 108C is angled at the angle a such that the outlet 182 does not penetrate through the inner periphery 174 and the inlet 180 does not penetrated the seal face 176 that interfaces with the respective support shell 68, 70. In this disclosed non-limiting embodiment, the effusion passages 108C readily facilitate effusion cooling of an edge 190 of the liner panels 72, 74. Such edges are also subject to thermal degradation.

With reference to FIG. 9, at least one of the multiple of dilution passage 116 in another disclosed non-limiting embodiment, is defined by an annular grommet 190 mounted between the respective support shell 68, 70 and associated liner panels 72, 74 along axis D. The annular grommet 190, generally includes a transverse structure 120D with a wall 192 that defines an outer periphery 194, an inner periphery 196 and a seal face 198 therebetween (also shown in FIG. 10) as generally above described. It should be appreciated that the transverse structure need not be linear. The annular grommet 190 permits the respective support shell 68, 70 and associated liner panels 72, 74 to be manufactured as generally consistent flat panels as the annular grommet 190 separately defines the dilution passage 116.

In this disclosed non-limiting embodiment, an effusion passages 108D is non-linear and defined by the annular grommet 190. The effusion passages 108D includes an inlet 201 (also shown in FIG. 10) in the outer periphery 194 and an outlet 202 adjacent a hot side 204 generally parallel to the hot side 112 of the respective liner panel 72, 74. In this disclosed non-limiting embodiment, the effusion passages 108D is non-linear and does not penetrate through the inner periphery 156. The annular grommet 190 may be brazed or otherwise mounted to the liner panels 72, 74. Alternatively, the annular grommet 190 is integral with the liner panel 72, 74 manufactured via, for example, additive manufacturing.

The transverse structure as defined herein includes but is not limited to any structure between the relatively parallel support shell 68, 70 and respective liner panels 72, 74. It should be appreciated that the transverse structure is shown adjacent to the annular combustion chamber 66 within the combustor section 26, various other wall assemblies within a gas turbine engine such as within the walls of the augmentor section 12, the exhaust duct section 14 and/or the nozzle section 16 (FIG. 2) that may alternatively or additionally benefit herefrom. That is, the transverse structure may alternatively or additionally located within engine sections other than the combustor section 26 which utilize impingement cooled wall arrangement.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreci-

What is claimed is:

1. A wall assembly within a gas turbine engine having an axial centerline, comprising:
   a support shell having a first side and a second side opposite the first side;
   a liner panel mounted to the support shell, the liner panel having a cold side facing the support shell and a hot side opposite the cold side; and
   an annular grommet mounted between the support shell and the liner panel, the annular grommet comprising a transverse structure comprising a wall, the wall having a first surface and a second surface opposite the first surface, the annular grommet further comprising at least one effusion passage, the at least one effusion passage including an inlet in the first surface of the wall, the annular grommet further comprising an outer portion, mounted between the second side of the support shell and the cold side of the liner panel, and an inner portion comprising the second surface of the wall;
   wherein the inner portion of the annular grommet has a grommet hot side and a grommet cold side opposite the grommet hot side and wherein the grommet hot side of the annular grommet and the hot side of the liner panel collectively form a first common surface and the grommet cold side of the annular grommet and the first side of the support shell collectively form a second common surface radially spaced from the second side of the support shell with respect to the axial centerline,
   wherein the second surface of the wall at least partially defines and interfaces with a dilution passage, and
   wherein the transverse structure further comprises a seal face configured to form a seal between the transverse structure and the second side of the support shell about a circumference of the dilution passage; wherein the support shell includes a radial surface extending between the first side of the support shell and the second side of the support shell and wherein the radial surface of the support shell abuts an outer radial surface of the annular grommet extending between the seal face and the grommet cold side of the annular grommet.

2. The wall assembly as recited in claim 1, wherein the first surface is at least partially circular.

3. The wall assembly as recited in claim 1, wherein the first surface is at least partially linear.

4. The wall assembly as recited in claim 1, wherein the at least one effusion passage extends at an angle $\alpha$, and the angle $\alpha$ is defined such that an outlet of the at least one effusion passage does not penetrate the second surface of the wall.

5. The wall assembly as recited in claim 1, wherein the inlet is in communication with an impingement cavity.

6. The wall assembly as recited in claim 5, wherein the liner panel and the support shell define the impingement cavity therebetween.

7. The wall assembly as recited in claim 1, wherein the at least one effusion passage extends at an angle $\alpha$, the angle $\alpha$ defined such that an outlet of the at least one effusion passage extends through the grommet hot side of the annular grommet, and the grommet hot side of the annular grommet is parallel to the hot side of the liner panel.

8. The wall assembly as recited in claim 1, wherein the transverse structure is located within one of a combustor section, an augmentor section, an exhaust duct section or a nozzle section of the gas turbine engine.

9. The wall assembly of claim 1, wherein the at least one effusion passage includes an outlet in the grommet hot side of the annular grommet.

10. The wall assembly of claim 1, wherein the liner panel includes a radial surface extending between the cold side of the liner panel and the hot side of the liner panel and wherein the radial surface of the liner panel abuts a second radial surface of the annular grommet.

11. The wall assembly of claim 10, wherein the seal face of the transverse structure is in contact with the second surface of the support shell to form the seal and wherein the transverse structure is radially fixed relative to the second side of the support shell.

12. The wall assembly of claim 1, wherein the at least one effusion passage is non-linear and defined between the annular grommet and the liner panel.

13. The wall assembly of claim 12, wherein the at least one effusion passage has a radially extending portion, with respect to a center axis of the dilution passage, in fluid communication with the inlet of the at least one effusion passage and wherein the at least one effusion passage has an axially extending portion extending perpendicular to the radially extending portion and in fluid communication with the outlet of the at least one effusion passage.

* * * * *